United States Patent
He et al.

(10) Patent No.: US 11,405,890 B2
(45) Date of Patent: Aug. 2, 2022

(54) METHOD AND DEVICE FOR COMMUNICATING SYSTEM INFORMATION UPDATE INFORMATION

(71) Applicant: GUANGDONG OPPO MOBILE TELECOMMUNICATIONS CORP., LTD., Guangdong (CN)

(72) Inventors: Chuanfeng He, Guangdong (CN); Weijie Xu, Guangdong (CN); Shukun Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 21 days.

(21) Appl. No.: 17/095,298

(22) Filed: Nov. 11, 2020

(65) Prior Publication Data
US 2021/0068074 A1    Mar. 4, 2021

Related U.S. Application Data

(63) Continuation of application No. PCT/CN2019/087474, filed on May 17, 2019.
(Continued)

(51) Int. Cl.
*H04W 68/02* (2009.01)
*H04W 68/00* (2009.01)
(Continued)

(52) U.S. Cl.
CPC .......... *H04W 68/02* (2013.01); *H04W 48/12* (2013.01); *H04W 48/16* (2013.01); *H04W 68/005* (2013.01); *H04W 72/042* (2013.01)

(58) Field of Classification Search
CPC ..... H04W 68/02; H04W 48/12; H04W 48/16; H04W 68/005; H04W 72/042; H04W 68/00
See application file for complete search history.

(56) References Cited

U.S. PATENT DOCUMENTS

2014/0348037 A1* 11/2014 Yang .................... H04W 48/12
370/312
2019/0124625 A1* 4/2019 Takeda .................. H04W 48/10
(Continued)

FOREIGN PATENT DOCUMENTS

EP          3364689 A1    8/2018
WO       2015143244 A1    9/2015
(Continued)

OTHER PUBLICATIONS

International Search Report for PCT/CN2019/087474 dated Aug. 5, 2019.
(Continued)

*Primary Examiner* — Minjung Kim
(74) *Attorney, Agent, or Firm* — Young Basile Hanlon & MacFarlane, P.C.

(57) ABSTRACT

A method and device for receiving system information update information, and a method and device for transmitting the system information update information are provided. The method for receiving system information update information may include: receiving, by a terminal device, paging downlink control information (DCI) which includes update information of one or more system information block (SIB) types; and acquiring, by the terminal device, the update information of the one or more SIB types from the paging DCI.

16 Claims, 4 Drawing Sheets

A terminal device receives paging DCI which includes update information of one or more SIB types — 210

The terminal device acquires the update information of the one or more SIB types from the paging DCI — 220

Related U.S. Application Data

(60) Provisional application No. 62/674,080, filed on May 21, 2018.

(51) Int. Cl.
 *H04W 48/12* (2009.01)
 *H04W 48/16* (2009.01)
 *H04W 72/04* (2009.01)

(56) References Cited

U.S. PATENT DOCUMENTS

| | | | |
|---|---|---|---|
| 2020/0163050 A1* | 5/2020 | Lee | H04W 68/02 |
| 2021/0112580 A1* | 4/2021 | Chen | H04L 5/001 |
| 2021/0297986 A1* | 9/2021 | Liu | H04W 68/00 |

FOREIGN PATENT DOCUMENTS

| | | |
|---|---|---|
| WO | 2017028024 A1 | 2/2017 |
| WO | 2017078023 A1 | 5/2017 |
| WO | 2018016922 A1 | 1/2018 |

OTHER PUBLICATIONS

Extended European Search Report for EP Application 19806839.7 dated Jun. 11, 2021. (9 pages).
LG Electronics, Paging design in NR, 3GPP TSG RAN WG1 Meeting #93, R1-1806604, May 21-25, 2018. (4 pages).
Samsung, SIB for access control information, 3GPP TSG-RAN WG2#101 Bis, R2-1805269, Apr. 15-20, 2018 (3 pages).
Communication pursuant to Article 94(3) EPC for EP Application 19806839.7 dated Dec. 8, 2021. (7 pages).

* cited by examiner

A terminal device receives paging DCI which includes update information of one or more SIB types ~210

The terminal device acquires the update information of the one or more SIB types from the paging DCI ~220

METHOD AND DEVICE FOR COMMUNICATING SYSTEM INFORMATION UPDATE INFORMATION

CROSS-REFERENCE TO RELATED APPLICATION(S)

The present application is a continuation application of International Application No. PCT/CN2019/087474, filed on May 17, 2019, which claims priority to U.S. provisional application No. 62/674,080, filed on May 21, 2018. The present application claims priority and the benefit of the above-identified applications and the above-identified applications are incorporated by reference herein in their entireties.

TECHNICAL FIELD

The present disclosure relates to the communication field, and more particularly, to a method and device for receiving system information update information, and a method and device for transmitting the system information update information.

BACKGROUND

In communication systems such as a long Term Evolution (LTE) system, system information (SI) update information is carried in a paging message. Scheduling information of the paging message is transmitted on a physical downlink control channel (PDCCH), and the paging message is transmitted on a physical downlink shared channel (PDSCH). Therefore, a terminal device in a connected state (e.g., RRC_CONNECTED state) has to decode the PDSCH to receive the SI update information.

With fast developing of communication technologies, communication systems such as a New Radio (NR) system may support sending SI update information in paging downlink control information (DCI). For example, a short message in the paging DCI may include system information update information (e.g., systemInfoModification), indication of a Commercial Mobile Alert System (CMAS) (e.g., cmas-Indication), and/or indication of an Earthquake and Tsunami Warning System (ETWS) (e.g., etws-Indication). Therefore, a terminal device in a connected state may only monitor the PDCCH and does not need to decode the PDSCH in one or multiple paging occasions during a modification period. This may reduce the power consumption of the terminal device.

The SI update information (e.g., systemInfoModification) in a short message may be indicated by one bit, which indicates whether the system information is modified or not. However, the system information may include many system information block (SIB) types, such as SIB1, SIB2, . . . . Thus in this case, a terminal device has to receive all SIB types of the system information to acquire one or several updated SIB types therein. It may cause a waste of the power of the terminal device.

SUMMARY

Implementations of the present disclosure provide a method and device for receiving system information update information, and a method and device for transmitting the system information update information.

In one aspect, a method for receiving system information update information is provided, which may include: receiving, by a terminal device, paging downlink control information (DCI) which comprises update information of one or more system information block (SIB) types; and acquiring, by the terminal device, the update information of the one or more SIB types from the paging DCI.

In another aspect, a method for transmitting system information update information is provided, which may include: generating, by a network device, paging DCI, wherein the paging DCI includes update information of one or more SIB types; and transmitting, by the network device, the paging DCI including the update information of the one or more SIB types.

In yet another aspect, a terminal device is provided, which may include: a receiving unit, configured to receive paging DCI which includes update information of one or more SIB types; and an acquiring unit, configured to acquire the update information of the one or more SIB types from the paging DCI.

In still another aspect, a network device is provided, which may include: a generating unit, configured to generate paging DCI, wherein the paging DCI includes update information of one or more SIB types; and a transmitting unit, configured to transmit the paging DCI including the update information of the one or more SIB types.

DETAILED DESCRIPTION

The technical solutions of example implementations of the present disclosure will be described in the following with reference to the accompanying drawings.

It should be understood that the technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a long term evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a New Radio (NR) system.

A terminal device in implementations of the present disclosure may refer to user equipment (UE), an access terminal, a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, an on-board device, a wearable device, a terminal device in a 5G network, or a terminal device in an evolved public land mobile network (PLMN), etc., which are not restricted in the implementations of the present disclosure.

A network device in implementations of the present disclosure may be a device for communicating with a terminal device, and the network device may be a Base Transceiver Station (BTS) in the GSM or CDMA system, a NodeB (NB) in the WCDMA system, an evolved base station (eNB or eNodeB) in the LTE system, or a wireless controller in a Cloud Radio Access Network (CRAN) scenario, or the network device may be a relay station, an access point, an on-board device, a wearable device, a network device in a 5G network, or a network device in an evolved PLMN, etc., which are not restricted in the implementations of the present disclosure.

Figures 1, 2:
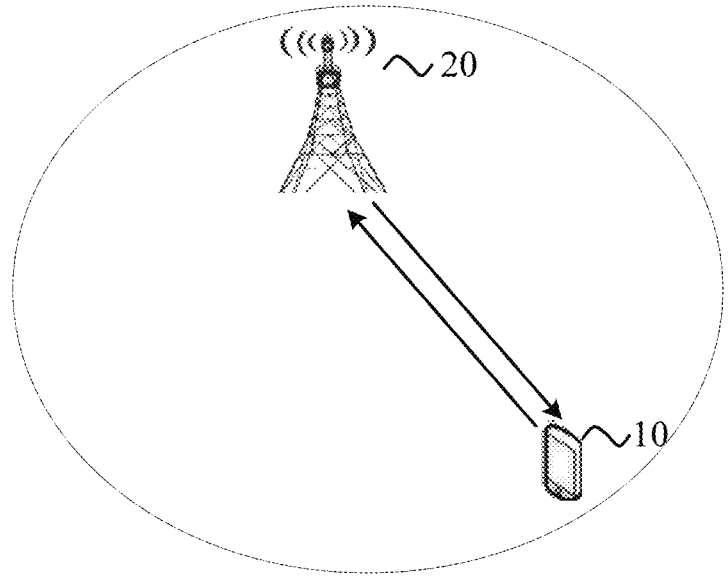
FIG. 1 is a schematic diagram of an example application scenario where an implementation of the present disclosure may be applied.
FIG. 2 is a schematic flowchart of a method for receiving system information update information according to an example implementation of the present disclosure.

FIG. 1 is a schematic diagram of an example application scenario where an implementation of the present disclosure may be applied. A communication system shown in FIG. 1 may include a terminal device 10 and a network device 20. The network device 20 is configured to provide communication services for the terminal device 10 and access a core network. The terminal device 10 accesses a network by searching for a synchronization signal, or a broadcast signal, etc., transmitted by the network device 20 to communicate with the network. Arrows shown in FIG. 1 may indicate uplink/downlink transmission through cellular links between the terminal device 10 and the network device 20.

In order to address the problem in the prior art, the SI update information may be indicated per type of SIB. It has the benefit of saving power of a terminal device, since the terminal device only needs to receive updated SIB types based on the per SIB type update information. In this case, one bit per SIB type is needed in the SI update information. Thus more than 10 bits may be needed for the SI update information, considering existence of so many SIB types.

When the SI update information is carried in paging DCI, the limitation of payload size in DCI may further be considered. The size of paging DCI may not be able to carry the SI update information of all the SIB types, if one bit is needed per SIB type.

FIG. 2 shows a schematic flowchart of a method for receiving SI update information according to an example implementation of the present disclosure. As shown in FIG. 2, the method may include actions 210-220.

In 210, a terminal device receives paging DCI which includes update information of one or more SIB types.

In 220, the terminal device acquires the update information of the one or more SIB types from the paging DCI.

In an example implementation, the terminal device may receive the paging DCI including the update information of the one or more SIB types from a network device.

In an example implementation, the paging DCI may include a bit or bit group indicating update information of each of the one or more SIB types. The bit or bit group in the paging DCI may be used for indicating whether the each of the one or more SIB types is modified. An example of the SI update information in the paging DCI is shown in Table 1 below.

TABLE 1

An example of SI update information

| Bit | Field in SI update information |
|---|---|
| 1 | systemInfoModification for SIB type 1 |
| 2 | systemInfoModification for SIB type 2 |
| . . . | . . . |

In the above example, the SI update information may include a respective bit for indicating update information of each SIB type in the SI. For example, the one bit for each SIB type may indicate that the SIB type in the SI is modified when the bit has the value 1, and indicate that the SIB type in the SI is not modified when the bit has the value 0, or alternatively, indicate that the SIB type in the SI is modified when the bit has the value 0 and that the SIB type in the SI is not modified when the bit has the value 1.

Alternatively, the SI update information may include a bit group indicating update information of each SIB type in the SI. For example, if the SI includes SIB1 and SIB2, update of the SI may include 3 situations, i.e., only SIB1 is modified; only SIB2 is modified; and both SIB1 and SIB2 are modified. Thus a bit group of 2 bits may be used to indicate the 3 situations respectively. For example, 00 is used to indicate that only SIB1 is modified; 01 is used to indicate that only SIB2 is modified; and 10 is used to indicate that both SIB1 and SIB2 are modified. Further, if needed, 11 may be used to indicate that neither SIB1 nor SIB2 in the SI is modified. Of course, other ways of indications may be applied, as long as the bit group can indicate update information of each SIB type in the SI.

In an example implementation, the paging DCI may include a bit or bit group indicating update information of each of one or more SIB type groups, wherein at least one SIB type group in the one or more SIB type groups includes a plurality of SIB types. The bit or bit group in the paging DCI may be used for indicating whether the each of the one or more SIB type groups is modified. Another example of the SI update information in the paging DCI is shown in Table 2 below.

TABLE 2

Another example of SI update information

| Bit | Field in SI update information |
|---|---|
| 1 | systemInfoModification for SIB type group 1, which includes SIB1 |
| 2 | systemInfoModification for SIB type group 2, which includes SIB2~SIB5 |
| . . . . . . | |

In the above example, the SIB type group 1 in the SI includes SIB1, and the SIB type group 2 in the SI includes SIB2 to SIB 5. The SI update information may include a respective bit for indicating update information of each SIB type group in the SI. For example, the one bit for each SIB type group may indicate that at least one SIB type in the SIB type group is modified when the bit has the value 1, and indicate that the SIB type group is not modified when the bit has the value 0, or alternatively, indicate that at least one SIB type in the SIB type group is modified when the bit has the value 0 and that the SIB type group is not modified when the bit has the value 1.

Alternatively, the SI update information may include a bit group indicating update information of each SIB type group in the SI. For example, if the SI includes SIB type group 1 and SIB type group 2, update of the SI may include 3 situations, i.e., only the SIB type group 1 is modified; only the SIB type group 2 is modified; and both the SIB type group 1 and SIB type group 2 are modified. Herein, a SIB type group is modified means that at least one SIB type in the SIB type group is modified. Thus a bit group of 2 bits may be used to indicate the 3 situations respectively. For example, 00 is used to indicate that only the SIB type group 1 is modified; 01 is used to indicate that only the SIB type group 2 is modified; and 10 is used to indicate that both the SIB type group 1 and the SIB type group 2 are modified. Further, if needed, 11 may be used to indicate neither the SIB type group 1 nor the SIB type group 2 in the SI is modified. Of course, other ways of indications may be applied, as long as the bit group can indicate update information of each SIB type group in the SI.

In an example implementation, the method may further include: determining, by the terminal device, a manner of indicating the update information of the one or more SIB types in the paging DCI according to content of the paging DCI.

Particularly, an indication may be introduced in the paging DCI for indicating the content of the paging DCI. For example, the indication may be used to indicate one of following three cases: the paging DCI includes a short message and does not include scheduling information for a paging message; the paging DCI includes scheduling information for a paging message and does not include a short message; and the paging DCI includes a short message and scheduling information for a paging message. In an example, the indication in the paging DCI may be used to indicate one of the cases of short message only, scheduling information for a paging message only, and short message together with scheduling information for a paging message.

Different manners of indicating the update information of the one or more SIB types in the SI may lead to different information sizes of the SI update information. For the case that the paging DCI includes a short message but does not include scheduling information for a paging message, more left bits can be used for SI update information. In this case, the manner of indicating the update information of the one or more SIB types in the paging DCI may be that update information of each of the one or more SIB types is indicated by a bit or bit group in the paging DCI, so as to save power of the terminal device. For the case in which the paging DCI includes both a short message and scheduling information for a paging message, less bits can be used for SI update information. In this case, the manner of indicating the update information of the one or more SIB types in the paging DCI may be that update information of each of one or more SIB type groups is indicated by a bit or bit group in the paging DCI, so as to reduce the overhead of the SI update information in the paging DCI, wherein at least one SIB type group in the one or more SIB type groups includes a plurality of SIB types. Alternatively, in the latter case, the manner of indicating the update information of the one or more SIB types in the paging DCI may be that update information of all SIB types is indicated by a bit in the paging DCI, so as to reduce the overhead of the SI update information in the paging DCI to the greatest extent. Thus such a technical solution may have good flexibility in communicating the SI update information, and thus has wide applicability in communication systems.

Correspondingly, the terminal device may determine the manner of indicating the update information of the one or more SIB types in the paging DCI according to the indication in the paging DCI. For example, when the indication in the paging DCI indicates that the paging DCI includes a short message and does not include scheduling information for a paging message, the terminal device may determine that the manner of indicating the update information of the one or more SIB types in the paging DCI is that update information of each of the one or more SIB types is indicated by a bit or bit group in the paging DCI.

When the indication in the paging DCI indicates that the paging DCI includes a short message and scheduling information for a paging message, the terminal device may determine that the manner of indicating the update information of the one or more SIB types in the paging DCI is that update information of each of one or more SIB type groups is indicated by a bit or bit group in the paging DCI, wherein at least one SIB type group in the one or more SIB type groups includes a plurality of SIB types. Alternatively, when the indication in the paging DCI indicates that the paging DCI includes a short message and scheduling information for a paging message, the terminal device may determine that the manner of indicating the update information of the one or more SIB types in the paging DCI is that update information of all SIB types is indicated by a bit in the paging DCI.

In an example implementation, the update information of the one or more SIB types is a part of the short message in the paging DCI. Alternatively, the SI update information may be separate from the short message in the paging DCI.

There may be other approaches for the terminal device to determine the manner of indicating the update information of the one or more SIB types in the paging DCI. In an example, the terminal device may determine the manner of indicating the update information of the one or more SIB types in the paging DCI according to a predefined standard. In another example, the terminal device may determine the manner of indicating the update information of the one or more SIB types in the paging DCI according to notification of a network device through broadcast of system information or a radio resource control (RRC) signaling. Specifically, the manner of indicating the update information of the one or more SIB types in the paging DCI may be specified in a predefined standard, so that the terminal device may be aware of the manner according to the standard. Alternatively, a network device may notify the terminal device of the manner of indicating the update information of the one or more SIB types in the paging DCI through broadcast of system information, e.g., master information block, or through transmission of RRC signaling. Of course, the network device may notify the terminal device by other ways, such as by other types of signaling. The notification may be performed before the terminal device receives the paging DCI.

Herein, the manner of indicating the update information of the one or more SIB types in the paging DCI specified in the predefined standard or notified by the network device may be any one of the following manners: update information of each of the one or more SIB types is indicated by a bit or bit group in the paging DCI; update information of each of one or more SIB type groups is indicated by a bit or bit group in the paging DCI, wherein at least one SIB type group in the one or more SIB type groups includes a plurality of SIB types; and update information of all SIB types is indicated by a bit in the paging DCI.

In example implementations of the present disclosure, update information of one or more SIB types is carried in the paging DCI, thus the terminal device may receive updated SIB types based on the update information of the SIB types, and thus the power consumption of the terminal device may be reduced. Besides, technical solutions of the present disclosure may have good flexibility and applicability in communication systems.

Figure 3:
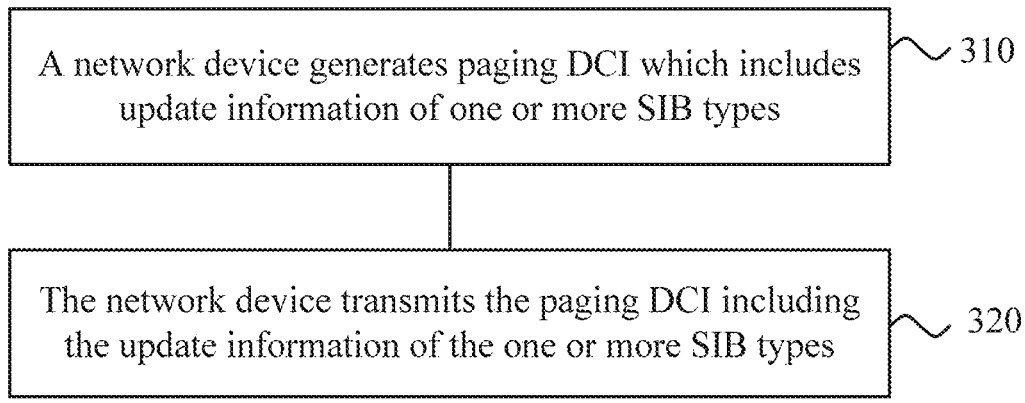
FIG. 3 is a schematic flowchart of a method for transmitting system information update information according to an example implementation of the present disclosure.

FIG. 3 shows a schematic flowchart of a method for transmitting SI update information according to an example implementation of the present disclosure. As shown in FIG. 3, the method may include actions 310-320.

In 310, a network device generates paging DCI, wherein the paging DCI includes update information of one or more SIB types.

In 320, the network device transmits the paging DCI including the update information of the one or more SIB types.

In an example implementation, the paging DCI may include a bit or bit group indicating update information of each of the one or more SIB types.

In an example implementation, the paging DCI may include a bit or bit group indicating update information of each of one or more SIB type groups, wherein at least one SIB type group in the one or more SIB type groups includes a plurality of SIB types.

In an example implementation, when the paging DCI includes a short message and does not include scheduling information for a paging message, the paging DCI includes a bit or bit group indicating update information of each of the one or more SIB types.

In an example implementation, when the paging DCI includes a short message and scheduling information for a paging message, the paging DCI includes a bit or bit group indicating update information of each of one or more SIB type groups, wherein at least one SIB type group in the one or more SIB type groups includes a plurality of SIB types. Alternatively, when the paging DCI includes a short message and scheduling information for a paging message, the paging DCI includes a bit indicating update information of all SIB types.

In an example implementation, the paging DCI may include an indication used for indicating content of the paging DCI.

In an example implementation, the update information of the one or more SIB types may be a part of the short message in the paging DCI.

In an example implementation, if the paging DCI includes a bit or bit group indicating update information of each of the one or more SIB types, the bit or bit group in the paging DCI is used for indicating whether the each of the one or more SIB types is modified.

In an example implementation, if the paging DCI includes a bit or bit group indicating update information of each of one or more SIB type groups, the bit or bit group in the paging DCI is used for indicating whether the each of the one or more SIB type groups is modified.

In an example implementation, the method may further include: notifying, by the network device, a terminal device of a manner of indicating the update information of the one or more SIB types in the paging DCI through broadcast of system information or a radio resource control signaling. Herein, the manner of indicating the update information of the one or more SIB types in the paging DCI specified in the predefined standard or notified by the network device may be any one of the following manners: update information of each of the one or more SIB types is indicated by a bit or bit group in the paging DCI; update information of each of one or more SIB type groups is indicated by a bit or bit group in the paging DCI, wherein at least one SIB type group in the one or more SIB type groups includes a plurality of SIB types; and update information of all SIB types is indicated by a bit in the paging DCI.

It should be understood that the method of FIG. 3 corresponds to the method of FIG. 2, and relevant details and technical effects about the method of FIG. 3 may be similar as those stated above in the example implementations relating to the method of FIG. 2, and will not be repeated here for conciseness.

Figure 4:
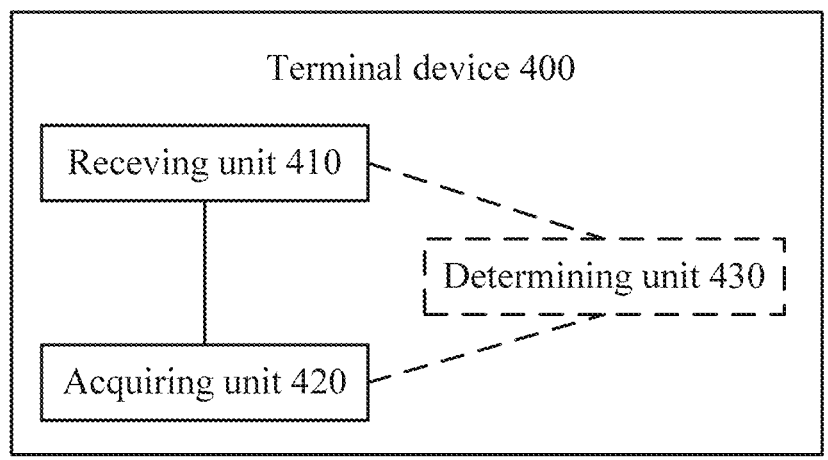
FIG. 4 is a schematic diagram of a terminal device according to an example implementation of the present disclosure.

FIG. 4 shows a schematic diagram of a terminal device 400 according to an example implementation of the present disclosure. As shown in FIG. 4, the terminal device 400 may include a receiving unit 410 and an acquiring unit 420. The receiving unit 410 is configured to receive paging DCI which includes update information of one or more SIB types. The acquiring unit 420 is configured to acquire the update information of the one or more SIB types from the paging DCI.

In an example implementation, the paging DCI may include a bit or bit group indicating update information of each of the one or more SIB types.

In an example implementation, the paging DCI may include a bit or bit group indicating update information of each of one or more SIB type groups, wherein at least one SIB type group in the one or more SIB type groups includes a plurality of SIB types.

In an example implementation, the terminal device 400 may further include a determining unit 430, configured to acquire a manner of indicating the update information of the one or more SIB types in the paging DCI according to content of the paging DCI.

In an example implementation, the paging DCI may include an indication used for indicating the content of the paging DCI, and the determining unit 430 is configured to acquire the manner of indicating the update information of the one or more SIB types in the paging DCI according to the indication.

In an example implementation, the determining unit 430 is configured to determine that, when the indication in the paging DCI indicates that the paging DCI includes a short message and does not include scheduling information for a paging message, the manner of indicating the update information of the one or more SIB types in the paging DCI is that update information of each of the one or more SIB types is indicated by a bit or bit group in the paging DCI.

In an example implementation, the determining unit 430 is configured to determine that, when the indication in the paging DCI indicates that the paging DCI includes a short message and scheduling information for a paging message, the manner of indicating the update information of the one or more SIB types in the paging DCI is that update information of each of one or more SIB type groups is indicated by a bit or bit group in the paging DCI, wherein at least one SIB type group in the one or more SIB type groups includes a plurality of SIB types. Alternatively, the determining unit 430 is configured to determine that, when the indication in the paging DCI indicates that the paging DCI includes a short message and scheduling information for a paging message, the manner of indicating the update information of the one or more SIB types in the paging DCI is that update information of all SIB types is indicated by a bit in the paging DCI.

In an example implementation, the update information of the one or more SIB types is a part of the short message in the paging DCI.

In an example implementation, if the paging DCI includes a bit or bit group indicating update information of each of the one or more SIB types, the bit or bit group in the paging DCI is used for indicating whether the each of the one or more SIB types is modified.

In an example implementation, if the paging DCI includes a bit or bit group indicating update information of each of one or more SIB type groups, the bit or bit group in the paging DCI is used for indicating whether the each of the one or more SIB type groups is modified.

In an example implementation, the terminal device 400 may further include a determining unit 430, configured to determine a manner of indicating the update information of the one or more SIB types in the paging DCI according to a predefined standard or according to notification of a network device through broadcast of system information or a radio resource control signaling. Herein, the manner of indicating the update information of the one or more SIB types in the paging DCI specified in the predefined standard or notified by the network device may be any one of the following manners: update information of each of the one or more SIB types is indicated by a bit or bit group in the paging DCI; update information of each of one or more SIB type groups is indicated by a bit or bit group in the paging DCI, wherein at least one SIB type group in the one or more SIB type groups includes a plurality of SIB types; and update information of all SIB types is indicated by a bit in the paging DCI.

It should be understood that the terminal device 400 in the above example implementations may correspond to the terminal device in the example implementations relating to the method of FIG. 2, and the operations and/or functions of the various units in the terminal device 400 are respectively for the purpose of implementing corresponding actions in the example implementations relating to the method of FIG. 2, and relevant details and technical effects thereof will not be repeated here for conciseness.

Figure 5:
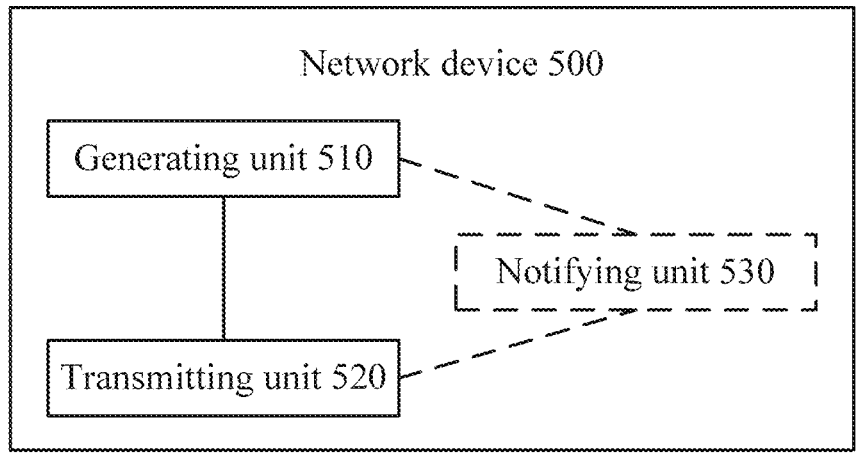
FIG. 5 is a schematic diagram of a network device according to an example implementation of the present disclosure.

FIG. 5 shows a schematic diagram of a network device 500 according to an example implementation of the present disclosure. As shown in FIG. 5, the network device 500 may include a generating unit 510 and a transmitting unit 520. The generating unit 510 is configured to generate paging DCI, wherein the paging DCI includes update information of one or more SIP types. The transmitting unit 520 is configured to transmit the paging DCI including the update information of the one or more SIB types.

In an example implementation, the paging DCI may include a bit or bit group indicating update information of each of the one or more SIB types.

In an example implementation, the paging DCI may include a bit or bit group indicating update information of each of one or more SIB type groups, wherein at least one SIB type group in the one or more SIB type groups includes a plurality of SIB types.

In an example implementation, when the paging DCI includes a short message and does not include scheduling information for a paging message, the paging DCI includes a bit or bit group indicating update information of each of the one or more SIB types.

In an example implementation, when the paging DCI includes a short message and scheduling information for a paging message, the paging DCI includes a bit or bit group indicating update information of each of one or more SIB type groups, wherein at least one SIB type group in the one or more SIB type groups includes a plurality of SIB types. Alternatively, when the paging DCI includes a short message and scheduling information for a paging message, the paging DCI includes a bit indicating update information of all SIB types.

In an example implementation, the paging DCI may include an indication used for indicating content of the paging DCI.

In an example implementation, the update information of the one or more SIB types may be a part of the short message in the paging DCI.

In an example implementation, if the paging DCI includes a bit or bit group indicating update information of each of the one or more SIB types, the bit or bit group in the paging DCI is used for indicating whether the each of the one or more SIB types is modified.

In an example implementation, if the paging DCI includes a bit or bit group indicating update information of each of one or more SIB type groups, the bit or bit group in the paging DCI is used for indicating whether the each of the one or more SIB type groups is modified.

In an example implementation, the network device 500 may further include a notifying unit 530, configured to notify a terminal device of a manner of indicating the update information of the one or more SIB types in the paging DCI through broadcast of system information or a radio resource control signaling. Herein, the manner of indicating the update information of the one or more SIB types in the paging DCI specified in the predefined standard or notified by the network device may be any one of the following manners: update information of each of the one or more SIB types is indicated by a bit or bit group in the paging DCI; update information of each of one or more SIB type groups is indicated by a bit or bit group in the paging DCI, wherein at least one SIB type group in the one or more SIB type groups includes a plurality of SIB types; and update information of all SIB types is indicated by a bit in the paging DCI.

It should be understood that the network device 500 in the above example implementations may correspond to the network device in the example implementations described above with respect to FIG. 3, and the operations and/or functions of the various units in the network device 500 are respectively for the purpose of implementing corresponding actions in the example implementations with respect to FIG. 3, and relevant details and technical effects thereof will not be repeated here for conciseness.

Figure 6:
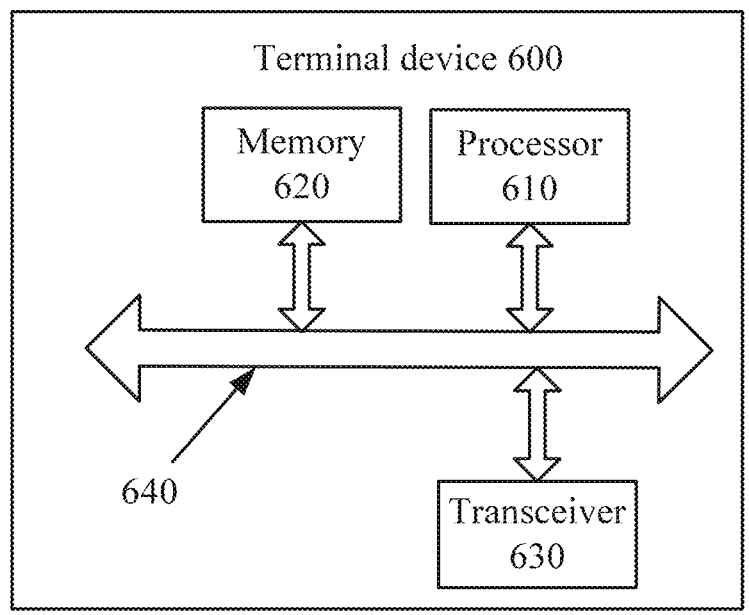
FIG. 6 is a schematic diagram of structure of a terminal device according to an example implementation of the present disclosure.

FIG. 6 shows a schematic diagram of structure of a terminal device 600 according to an example implementation of the present disclosure. As shown in FIG. 6, the terminal device 600 may include a processor 610, a memory 620, and a transceiver 630. The memory 620 is used for storing instructions, and the processor 610 is used for executing the instructions stored in the memory 620 to control the transceiver 630 to receive and/or send signals. The terminal device 600 may further include a bus system 640. The processor 610, the memory 620, and the transceiver 630 may be connected through the bus system 640.

It should be understood that the processor 610 may be a central processing unit (CPU) or another general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The memory 620 may include a read only memory and a random access memory, and provide instructions and data to the processor 610. A portion of the memory 620 may further include a non-volatile random access memory. For example, the memory 620 may further store device type information.

The bus system 640 may include, in addition to a data bus, a power bus, a control bus, a status signal bus, etc. However, for the sake of clarity, various buses are illustrated as the bus system 640 in FIG. 6.

The various actions in the example implementations relating to the method of FIG. 2 may be implemented by instructions in the form of software or integrated logic circuits of hardware in the processor 610. The actions of the method in the example implementations may be directly implemented by a hardware processor or by a combination of hardware and software modules in the processor. The software modules may be located in a typical storage medium in the art such as a random access memory, a flash memory, a read-only memory, a programmable read-only memory, an electrically erasable programmable memory, a register, etc. The storage medium may be located in the memory 620, and the processor 610 reads the information in the memory 620 and performs the actions of the method in the example implementations. For the sake of conciseness, relevant details and technical effects are not repeated here.

In the terminal device 600, the transceiver 630 may be configured to receive paging DCI which includes update information of one or more SIB types. The processor 610 may be configured to acquire the update information of the one or more SIB types from the paging DCI.

In an example implementation, the paging DCI may include a bit or bit group indicating update information of each of the one or more SIB types.

In an example implementation, the paging DCI may include a bit or bit group indicating update information of each of one or more SIB type groups, wherein at least one SIB type group in the one or more SIB type groups includes a plurality of SIB types.

In an example implementation, the processor 610 may further be configured to acquire a manner of indicating the update information of the one or more SIB types in the paging DCI according to content of the paging DCI.

In an example implementation, the paging DCI may include an indication used for indicating the content of the paging DCI, and the processor 610 is configured to acquire the manner of indicating the update information of the one or more SIB types in the paging DCI according to the indication.

In an example implementation, the processor 610 is configured to determine that, when the indication in the paging DCI indicates that the paging DCI includes a short message and does not include scheduling information for a paging message, the manner of indicating the update information of the one or more SIB types in the paging DCI is that update information of each of the one or more SIB types is indicated by a bit or bit group in the paging DCI.

In an example implementation, the processor 610 is configured to determine that, when the indication in the paging DCI indicates that the paging DCI includes a short message and scheduling information for a paging message, the manner of indicating the update information of the one or more SIB types in the paging DCI is that update information of each of one or more SIB type groups is indicated by a bit or bit group in the paging DCI, wherein at least one SIB type group in the one or more SIB type groups includes a plurality of SIB types. Alternatively, the processor 610 is configured to determine that, when the indication in the paging DCI indicates that the paging DCI includes a short message and scheduling information for a paging message, the manner of indicating the update information of the one or more SIB types in the paging DCI is that update information of all SIB types is indicated by a bit in the paging DCI.

In an example implementation, the update information of the one or more SIB types is a part of the short message in the paging DCI.

In an example implementation, if the paging DCI includes a bit or bit group indicating update information of each of the one or more SIB types, the bit or bit group in the paging DCI is used for indicating whether the each of the one or more SIB types is modified.

In an example implementation, if the paging DCI includes a bit or bit group indicating update information of each of one or more SIB type groups, the bit or bit group in the paging DCI is used for indicating whether the each of the one or more SIB type groups is modified.

In an example implementation, the processor 610 may further be configured to determine a manner of indicating the update information of the one or more SIB types in the paging DCI according to a predefined standard or according to notification of a network device through broadcast of system information or a radio resource control signaling. Herein, the manner of indicating the update information of the one or more SIB types in the paging DCI specified in the predefined standard or notified by the network device may be any one of the following manners: update information of each of the one or more SIB types is indicated by a bit or bit group in the paging DCI; update information of each of one or more SIB type groups is indicated by a bit or bit group in the paging DCI, wherein at least one SIB type group in the one or more SIB type groups includes a plurality of SIB types; and update information of all SIB types is indicated by a bit in the paging DCI.

Figure 7:
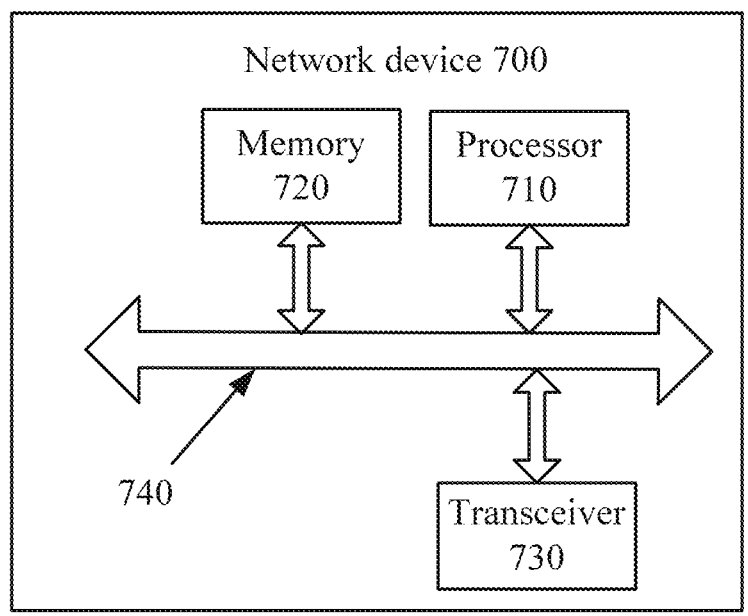
FIG. 7 is a schematic diagram of structure of a network device according to an example implementation of the present disclosure.

FIG. 7 shows a schematic diagram of structure of a network device 700 according to an example implementation of the present disclosure. As shown in FIG. 7, the network device 700 may include a processor 710, a memory 720, and a transceiver 730. The memory 720 is used for storing instructions, and the processor 710 is used for executing the instructions stored in the memory 720 to control the transceiver 730 to receive and/or send signals. The network device 700 may further include a bus system 740. The processor 710, the memory 720, and the transceiver 730 may be connected through the bus system 740.

It should be understood that the processor 710 may be a central processing unit (CPU) or another general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The memory 720 may include a read only memory and a random access memory, and provide instructions and data to the processor 710. A portion of the memory 720 may further include a non-volatile random access memory. For example, the memory 720 may further store device type information.

The bus system 740 may include, in addition to a data bus, a power bus, a control bus, a status signal bus, etc. However, for the sake of clarity, various buses are illustrated as the bus system 740 in FIG. 7.

The various actions in the example implementations relating to the method of FIG. 3 may be implemented by instructions in the form of software or integrated logic circuits of hardware in the processor 710. The actions of the method in the example implementations may be directly implemented by a hardware processor or by a combination of hardware and software modules in the processor. The software modules may be located in a typical storage medium in the art such as a random access memory, a flash memory, a read-only memory, a programmable read-only memory, an electrically erasable programmable memory, a register, etc. The storage medium may be located in the memory 720, and the processor 710 reads the information in the memory 720 and performs the actions of the method in the example implementations. For the sake of conciseness, relevant details and technical effects are not repeated here.

In the network device 700, the processor 710 may be configured to generate paging DCI, wherein the paging DCI includes update information of one or more SIB types. The transceiver 730 may be configured to transmit the paging DCI including the update information of the one or more SIB types.

In an example implementation, the paging DCI may include a bit or bit group indicating update information of each of the one or more SIB types.

In an example implementation, the paging DCI may include a bit or bit group indicating update information of each of one or more SIB type groups, wherein at least one SIB type group in the one or more SIB type groups includes a plurality of SIB types.

In an example implementation, when the paging DCI includes a short message and does not include scheduling information for a paging message, the paging DCI includes a bit or bit group indicating update information of each of the one or more SIB types.

In an example implementation, when the paging DCI includes a short message and scheduling information for a paging message, the paging DCI includes a bit or bit group indicating update information of each of one or more SIB type groups, wherein at least one SIB type group in the one or more SIB type groups includes a plurality of SIB types. Alternatively, when the paging DCI includes a short message and scheduling information for a paging message, the paging DCI includes a bit indicating update information of all SIB types.

In an example implementation, the paging DCI may include an indication used for indicating content of the paging DCI.

In an example implementation, the update information of the one or more SIB types may be a part of the short message in the paging DCI.

In an example implementation, if the paging DCI includes a bit or bit group indicating update information of each of the one or more SIB types, the bit or bit group in the paging DCI is used for indicating whether the each of the one or more SIB types is modified.

In an example implementation, if the paging DCI includes a bit or bit group indicating update information of each of one or more SIB type groups, the bit or bit group in the paging DCI is used for indicating whether the each of the one or more SIB type groups is modified.

In an example implementation, the processor 710 may further be configured to notify a terminal device of a manner of indicating the update information of the one or more SIB types in the paging DCI through broadcast of system information or a radio resource control signaling. Herein, the manner of indicating the update information of the one or more SIB types in the paging DCI specified in the predefined standard or notified by the network device may be any one of the following manners: update information of each of the one or more SIB types is indicated by a bit or bit group in the paging DCI; update information of each of one or more SIB type groups is indicated by a bit or bit group in the paging DCI, wherein at least one SIB type group in the one or more SIB type groups includes a plurality of SIB types; and update information of all SIB types is indicated by a bit in the paging DCI.

It should be understood that in various implementations of the present disclosure, the term "and/or" is used to describe an association relationship between associated objects, indicating that there may be three relationships, for example, a and/or b may indicate three situations: A alone, A and B, and B alone. In addition, the symbol "/" in the present disclosure generally indicates that objects of the former and the latter connected by "/" has an "or" relationship.

Those skilled in the art should understand that the elements and actions in the various implementations disclosed herein can be implemented in electronic hardware, computer software, or a combination of the electronic hardware and the computer software. In order to clearly illustrate the interchangeability of hardware and software, the composition and actions in the implementations have been described in general terms by functions in the above description. Whether these functions are performed in hardware or software depends on the specific application and design constraints of the technical solution. Skilled artisans may use different methods to implement the described functions for each particular application, but such implementation should not be considered to be beyond the scope of the present disclosure.

Those skilled in the art should understand that the specific working processes of the devices and units described above may correspond to the corresponding processes in the method implementations and may not be repeated for convenience and conciseness of description.

In various implementations of the present disclosure, it should be understood that the disclosed methods and devices may be implemented in other ways. For example, the device implementations described above are merely illustrative, the division of units is only a logical function division, and there may be other ways of division in actual implementations. For example, multiple units or components may be combined or integrated into another system, or some features may be ignored or not executed. In addition, the coupling or direct coupling or communication connection between each other shown or discussed may be an indirect coupling or communication connection through some interface, device or unit, or may be an electrical, mechanical or other form of connection.

The units described as separate units may or may not be physically separated, and the unit may or may not be a physical unit, i.e., it may be located in one place or may be distributed over multiple network units. Some or all of the elements can be selected according to actual needs to achieve the purpose of the implementations of the present disclosure.

In addition, various units in various implementations of the present disclosure may be integrated in one processing module, or the various units may be physically separate, or two or more units may be integrated in one module. The units can be implemented in the form of hardware or software functional modules.

The units may be stored in a computer readable storage medium if they are implemented in the form of software function modules and sold or used as an independent product. Based on such understanding, the technical solutions of the present disclosure may be embodied in the form of a software product, which is stored in a storage medium and includes instructions for causing a computer device (which may be a personal computer, a server, or a network device, etc.) to perform all or part of the actions of the method in various implementations of the present disclosure. The storage media may include a U disk, a mobile hard disk, a read-only memory, a random access memory, a magnetic disk, an optical disk, or other media capable of storing program codes.

What are described above are merely example implementations of the present disclosure. Although the example implementations have been described in considerable detail above, numerous variations and modifications will become apparent to those skilled in the art once the above disclosure is fully appreciated. It is intended that the following claims be interpreted to embrace all such variations and modifications.

What is claimed is:

1. A method for receiving system information update information, comprising:
    receiving, by a terminal device, paging downlink control information (DCI) which comprises update information of one or more system information block (SIB) types;
    acquiring, by the terminal device, the update information of the one or more SIB types from the paging DCI; and
    determining, by the terminal device, a manner of indicating the update information of the one or more SIB types in the paging DCI according to content of the paging DCI,
    wherein the paging DCI comprises an indication used for indicating the content of the paging DCI, and the terminal device determines the manner of indicating the update information of the one or more SIB types in the paging DCI according to the indication,
    wherein when the indication in the paging DCI indicates that the paging DCI comprises a short message and does not comprise scheduling information for a paging message, the terminal device determines that the manner of indicating the update information of the one or more SIB types in the paging DCI is that update information of each of the one or more SIB types is indicated by a bit or bit group in the paging DCI.

2. The method according to claim 1, wherein the paging DCI comprises a bit or bit group indicating update information of each of the one or more SIB types.

3. The method according to claim 1, wherein the paging DCI comprises a bit or bit group indicating update information of each of one or more SIB type groups, wherein at least one SIB type group in the one or more SIB type groups comprises a plurality of SIB types.

4. The method according to claim 1, wherein when the indication in the paging DCI indicates that the paging DCI comprises a short message and scheduling information for a paging message, the terminal device determines that the manner of indicating the update information of the one or more SIB types in the paging DCI is that update information of each of one or more SIB type groups is indicated by a bit or bit group in the paging DCI, wherein at least one SIB type group in the one or more SIB type groups comprises a plurality of SIB types.

5. The method according to claim 1, wherein the update information of the one or more SIB types is a part of the short message in the paging DCI.

6. The method according to claim 2, wherein the bit or bit group in the paging DCI is used for indicating whether the each of the one or more SIB types is modified.

7. The method according to claim 3, wherein the bit or bit group in the paging DCI is used for indicating whether the each of the one or more SIB type groups is modified.

8. The method according to claim 1, further comprising: determining, by the terminal device, a manner of indicating the update information of the one or more SIB types in the paging DCI according to a predefined standard or according to notification of a network device through broadcast of system information or a radio resource control signaling.

9. A method for transmitting system information update information, comprising:
    generating, by a network device, paging downlink control information (DCI), wherein the paging DCI comprises update information of one or more system information block (SIB) types;
    transmitting, by the network device, the paging DCI comprising the update information of the one or more SIB types; and
    notifying, by the network device, a terminal device of a manner of indicating the update information of the one or more SIB types in the paging DCI through broadcast of system information or a radio resource control signaling, so that the terminal device determines that the manner of indicating the update information of the one or more SIB types in the paging DCI is that update information of each of the one or more SIB types is indicated by a bit or bit group in the paging DCI,
    wherein when the paging DCI comprises a short message and does not comprise scheduling information for a paging message, the paging DCI comprises a bit or bit group indicating update information of each of the one or more SIB types,
    wherein the paging DCI comprises an indication used for indicating content of the paging DCI.

10. The method according to claim 9, wherein the paging DCI comprises a bit or bit group indicating update information of each of the one or more SIB types,
    or,
    the paging DCI comprises a bit or bit group indicating update information of each of one or more SIB type groups, wherein at least one SIB type group in the one or more SIB type groups comprises a plurality of SIB types.

11. The method according to claim 9, wherein when the paging DCI comprises a short message and scheduling information for a paging message, the paging DCI comprises a bit or bit group indicating update information of each of one or more SIB type groups, wherein at least one SIB type group in the one or more SIB type groups comprises a plurality of SIB types.

12. The method according to claim 9, wherein the update information of the one or more SIB types is a part of the short message in the paging DCI.

13. A terminal device, comprising:
    a transceiver, configured to receive paging downlink control information (DCI) which comprises update information of one or more system information block (SIB) types; and
    a processor, configured to acquire the update information of the one or more SIB types from the paging DCI,
    wherein the processor is further configured to acquire a manner of indicating the update information of the one or more SIB types in the paging DCI according to content of the paging DCI,
    wherein the paging DCI comprises an indication used for indicating the content of the paging DCI, and the processor is further configured to acquire the manner of indicating the update information of the one or more SIB types in the paging DCI according to the indication, wherein the processor is further configured to determine that, when the indication in the paging DCI indicates that the paging DCI comprises a short message and does not comprise scheduling information for a paging message, the manner of indicating the update information of the one or more SIB types in the paging DCI is that update information of each of the one or more SIB types is indicated by a bit or bit group in the paging DCI.

14. The terminal device according to claim 13, wherein the processor is further configured to determine that, when the indication in the paging DCI indicates that the paging DCI comprises a short message and scheduling information for a paging message, the manner of indicating the update information of the one or more SIB types in the paging DCI is that update information of each of one or more SIB type groups is indicated by a bit or bit group in the paging DCI, wherein at least one SIB type group in the one or more SIB type groups comprises a plurality of SIB types.

15. The terminal device according to claim 13, wherein the update information of the one or more SIB types is a part of the short message in the paging DCI.

16. The terminal device according to claim 13, wherein the processor is further configured to determine a manner of indicating the update information of the one or more SIB types in the paging DCI according to a predefined standard or according to notification of a network device through broadcast of system information or a radio resource control signaling.

* * * * *